(12) United States Patent
Jung et al.

(10) Patent No.: US 9,327,770 B2
(45) Date of Patent: May 3, 2016

(54) CENTER PILLAR REINFORCEMENT UNIT FOR VEHICLE

(71) Applicant: SUNGWOO HITECH CO., LTD., Busan (KR)

(72) Inventors: Yongwoo Jung, Gunpo-si (KR); Do-Hoi Koo, Suwon-si (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 14/583,249

(22) Filed: Dec. 26, 2014

(65) Prior Publication Data

US 2015/0183466 A1 Jul. 2, 2015

(30) Foreign Application Priority Data

Dec. 31, 2013 (KR) .......................... 10-2013-0169423
Dec. 10, 2014 (KR) .......................... 10-2014-0177808

(51) Int. Cl.
*B62D 25/04* (2006.01)

(52) U.S. Cl.
CPC ...................................... *B62D 25/04* (2013.01)

(58) Field of Classification Search
CPC ........................................................ B62D 25/04
USPC ................... 296/193.06, 209, 187.12, 203.02
See application file for complete search history.

(56) References Cited

U.S. PATENT DOCUMENTS

| 7,445,269 | B2* | 11/2008 | Yustick | B62D 21/157 296/187.01 |
| 8,967,703 | B2* | 3/2015 | Wawers | B62D 25/04 296/193.06 |
| 2011/0163571 | A1* | 7/2011 | Furusako | B62D 25/06 296/193.06 |
| 2012/0098297 | A1* | 4/2012 | Kurokawa | B62D 25/02 296/193.06 |
| 2012/0119477 | A1* | 5/2012 | Kim | B62D 25/04 280/801.2 |
| 2014/0346816 | A1* | 11/2014 | Craig | B62D 25/025 296/203.03 |

FOREIGN PATENT DOCUMENTS

| JP | 2009-274590 | 11/2009 |
| JP | 2011-136621 | 7/2011 |
| KR | 20-1998-0025657 | 8/1998 |
| KR | 10-2011-0051593 | 5/2011 |

* cited by examiner

*Primary Examiner* — Pinel Romain
(74) *Attorney, Agent, or Firm* — Lex IP Meister, PLLC

(57) ABSTRACT

A center pillar reinforcement unit for a vehicle may include: a plurality of reinforcement beams disposed on an exterior circumference of a center pillar inner panel in a height direction; an upper bracket disposed on an upper end portion of the center pillar inner panel and a roof rail, and fixing an end portion of the plurality of reinforcement beams; a center bracket disposed on a center portion of the center pillar inner panel, and fixing a center of the plurality of reinforcement beams; a lower bracket disposed on a lower portion of the center pillar inner panel, and fixing a lower portion of the plurality of reinforcement beams; and a gusset bracket formed inside of a side sill seal so that the lower portion of the plurality of reinforcement beams is assembled.

15 Claims, 5 Drawing Sheets

CENTER PILLAR REINFORCEMENT UNIT FOR VEHICLE

CROSS-REFERENCE TO RELATED APPLICATION

This application claims priority to and the benefit of Korean Patent Application No. 10-2013-0169423 filed in the Korean Intellectual Property Office on Dec. 31, 2013, and Korean Patent Application No. 10-2014-0177808 filed in the Korean Intellectual Property Office on Dec. 10, 2014, the entire contents of which are incorporated herein by reference.

BACKGROUND OF THE INVENTION (a) Field of the Invention

The present invention relates to a center pillar reinforcement unit for a vehicle. More particularly, the present invention relates to a center pillar reinforcement unit for a vehicle that induces collision energy caused by a side collision of the vehicle in a direction independent of an occupant and absorbs the collision energy by using a reinforcement beam disposed in a center pillar in a length direction, and accordingly, it is possible to improve energy-absorbing performance.

(b) Description of the Related Art

Generally, a center pillar of a vehicle body functions as a support between a front door and a rear door, maintains strength at the center of the side of the vehicle body, and is mounted between the front door and the rear door.

An upper side of the center pillar is assembled to a side outer panel, and a lower side of the center pillar is assembled to a side seal. The center pillar includes a center pillar outer panel and a center pillar inner panel.

A lower end of the center pillar outer panel is assembled to the side seal. Particularly, the lower end of the center pillar outer panel is welded to a side seal configured at the inside and lower side of a side panel.

That is, a lower end of the center pillar outer panel, an end of the side seal inner panel, and an end of the side seal outer panel are spot-welded in a state where the lower end of the center pillar outer panel, the end of side seal inner panel, and the end of side seal outer panel are overlapped.

When a side collision of the vehicle occurs in a state where the center pillar outer panel for the vehicle is connected to the side seal, the center pillar outer panel, a side molding, and the side seal are deformed to the inside of the vehicle body. At this time, since the center pillar outer panel transfers collision energy to other parts of the vehicle body, the center pillar outer panel affects energy-absorbing performance.

However, according to a prior art, the center pillar outer panel does not transfer collision energy occurring in a side collision of the vehicle in a direction independent of the occupants, and does not efficiently absorb collision energy, such that there is a problem that side strength of the vehicle is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a center pillar reinforcement unit in which a plurality of reinforcement beams are fixed through a bracket and collision energy is induced to a side seal provided at a lower portion of a vehicle body independent of an occupant, such that energy-absorbing performance is improved and overall strength of the side vehicle body is reinforced.

Further, the present invention has been made in an effort to provide a center pillar reinforcement unit in which a plurality of reinforcement beams are made of an ultra-high strength steel pipe and a predetermined section of the reinforcement beam is partially softened by a laser heat treatment, such that collision energy is absorbed therein and the collision energy is simultaneously induced to a side seal through bending of the softened section in a side collision.

A center pillar reinforcement unit for a vehicle according to an exemplary embodiment of the present invention may include: a plurality of reinforcement beams disposed on an exterior circumference of a center pillar inner panel in a height direction; an upper bracket disposed on an upper end portion of the center pillar inner panel and a roof rail, and fixing an end portion of the plurality of reinforcement beams; a center bracket disposed on a center portion of the center pillar inner panel, and fixing a center of the plurality of reinforcement beams; a lower bracket disposed on a lower portion of the center pillar inner panel, and fixing a lower portion of the plurality of reinforcement beams; and a gusset bracket formed inside of a side seal so that the lower portion of the plurality of reinforcement beams is assembled.

The plurality of reinforcement beam may be provided as a pair, and the pair of reinforcement beams are respectively disposed on a front side and a rear side of the center pillar inner panel in a length direction of the vehicle body neighboring each other.

The plurality of reinforcement beam may be made of tubes formed with a circular shape and formed by bending corresponding to an outer line of the center pillar inner panel.

Beads may be formed in an exterior circumference of the plurality of reinforcement beam between the center bracket and the lower bracket.

The beads may be formed such that a part of the exterior circumference of the reinforcement beam is pressed and formed with a flat shape.

Two seating surfaces may be formed in each of the upper bracket, the center bracket, and the lower bracket such that the reinforcement beams are seated therein, and the two seating surface are formed with a semicircular shape.

A width between the two seating surfaces in the center bracket may be wider than a width between the two seating surfaces in the upper bracket, and a width between the two seating surfaces in the lower bracket may be wider than the width between the two seating surfaces in the center bracket.

The lower portion of the plurality of reinforcement beams may be attached to the gusset bracket in the side sill by passing through upper side of the side sill.

The beads may be formed at opposite sides of the gusset bracket.

The upper bracket may be spot-welded to the roof rail and an exterior circumference of the center pillar inner panel, and the reinforcement beam may be $CO_2$-welded to the seating surface of the upper bracket.

The center bracket and the lower bracket may be spot-welded to the exterior circumference of the center pillar inner panel, and the reinforcement beam may be $CO_2$-welded to the seating surface of the center bracket and the lower bracket.

The plurality of reinforcement beams may be $CO_2$-welded inside the gusset bracket.

A predetermined section of the lower portion of the plurality of reinforcement beam may be formed as a softening processing section that is softening-processed by a laser heat treatment.

The softening processing section may be fixed to the inside of the center pillar inner panel and the side sill by the lower bracket and the gusset bracket.

The plurality of reinforcement beams may be CO2-welded to the upper side of the penetrated side sill, respectively.

The center bracket may be formed of an upper mounting bracket of a rear door.

The lower bracket may be formed of a lower mounting bracket of a rear door.

The plurality of reinforcement beams may be made of an ultra-high strength steel pipe.

According to an exemplary embodiment of the present invention, since a plurality of reinforcement beams are fixed in a center pillar through brackets, collision energy can be distributed toward both sides of the vehicle body and the side sill, and be absorbed.

Accordingly, energy-absorbing performance is improved, safety of the occupants can be ensured by reinforcing side strength of the vehicle body, a weight of the vehicle body can be reduced, and a configuration of the vehicle body can be simplified.

Further, the plurality of reinforcement beams are made of an ultra-high strength steel pipe, the predetermined section of the reinforcement beam is partially softened by a laser heat treatment, and the predetermined section of the reinforcement beam is supported to the side sill. Therefore, collision energy is absorbed therein, the collision energy is distributed to the side sill through bending of the softening processing section in a side collision, and it is possible to provide reliable energy-absorbing performance.

DETAILED DESCRIPTION OF THE EMBODIMENTS

Figure 1:
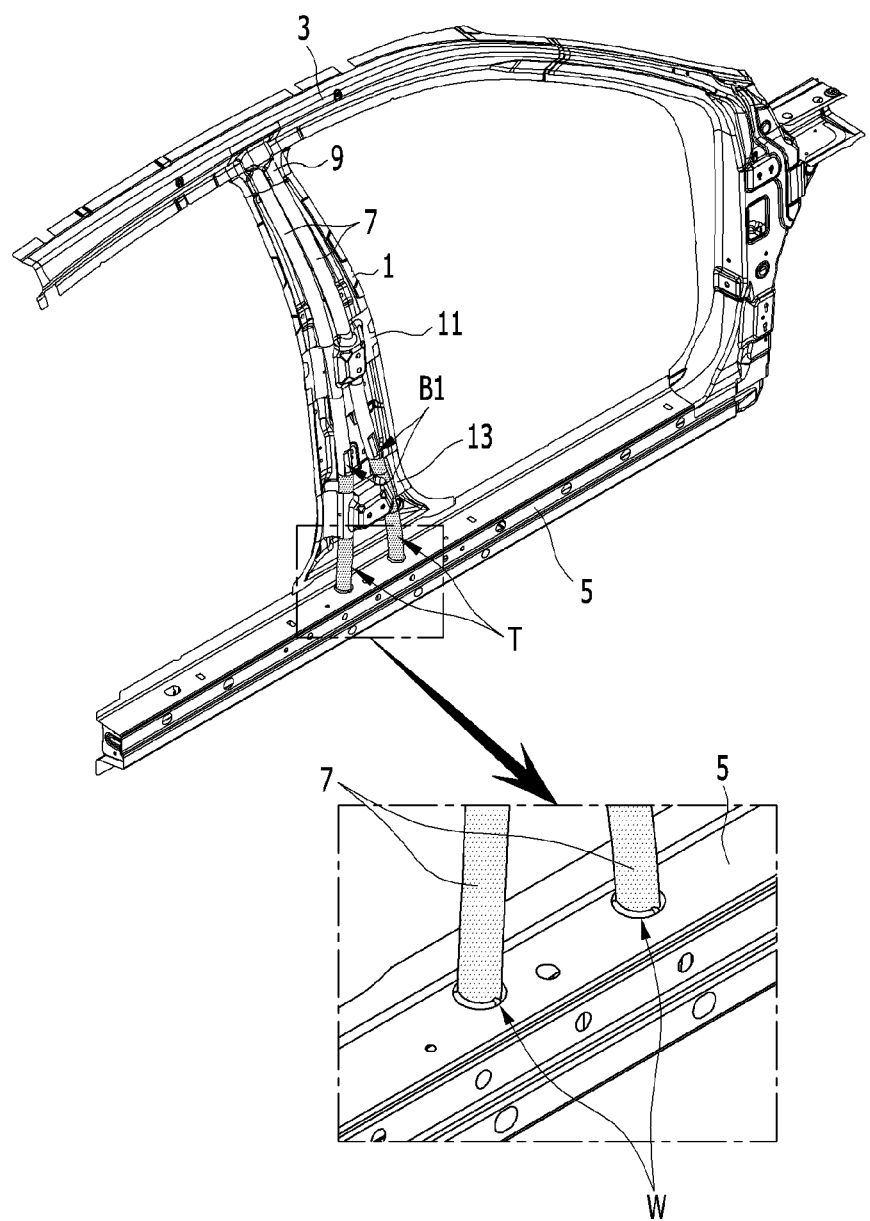
FIG. 1 is an outer perspective view illustrating a center pillar reinforcement unit for a vehicle disposed to a center pillar according to an exemplary embodiment of the present invention.

Here, an exemplary embodiment of the present invention will be described in detail with reference to accompanying drawings.

The sizes and thicknesses of the configurations shown in the drawings are provided selectively for the convenience of description, such that the present invention is not limited to those shown in the drawings and the thicknesses are exaggerated to make some parts and regions clear.

The drawings and description are to be regarded as illustrative in nature and not restrictive.

Figure 2:
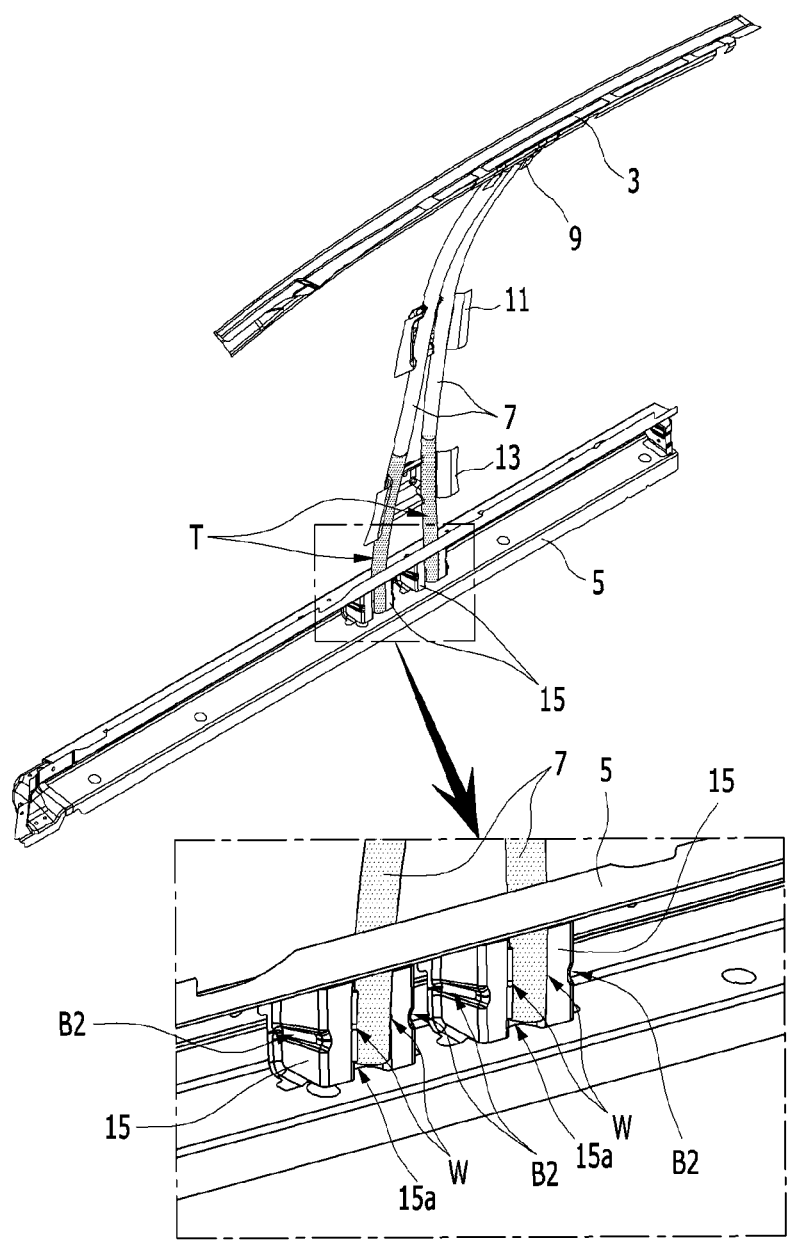
FIG. 2 is an inner perspective view illustrating a center pillar reinforcement unit for a vehicle disposed a center pillar according to an exemplary embodiment of the present invention.
Figure 3:
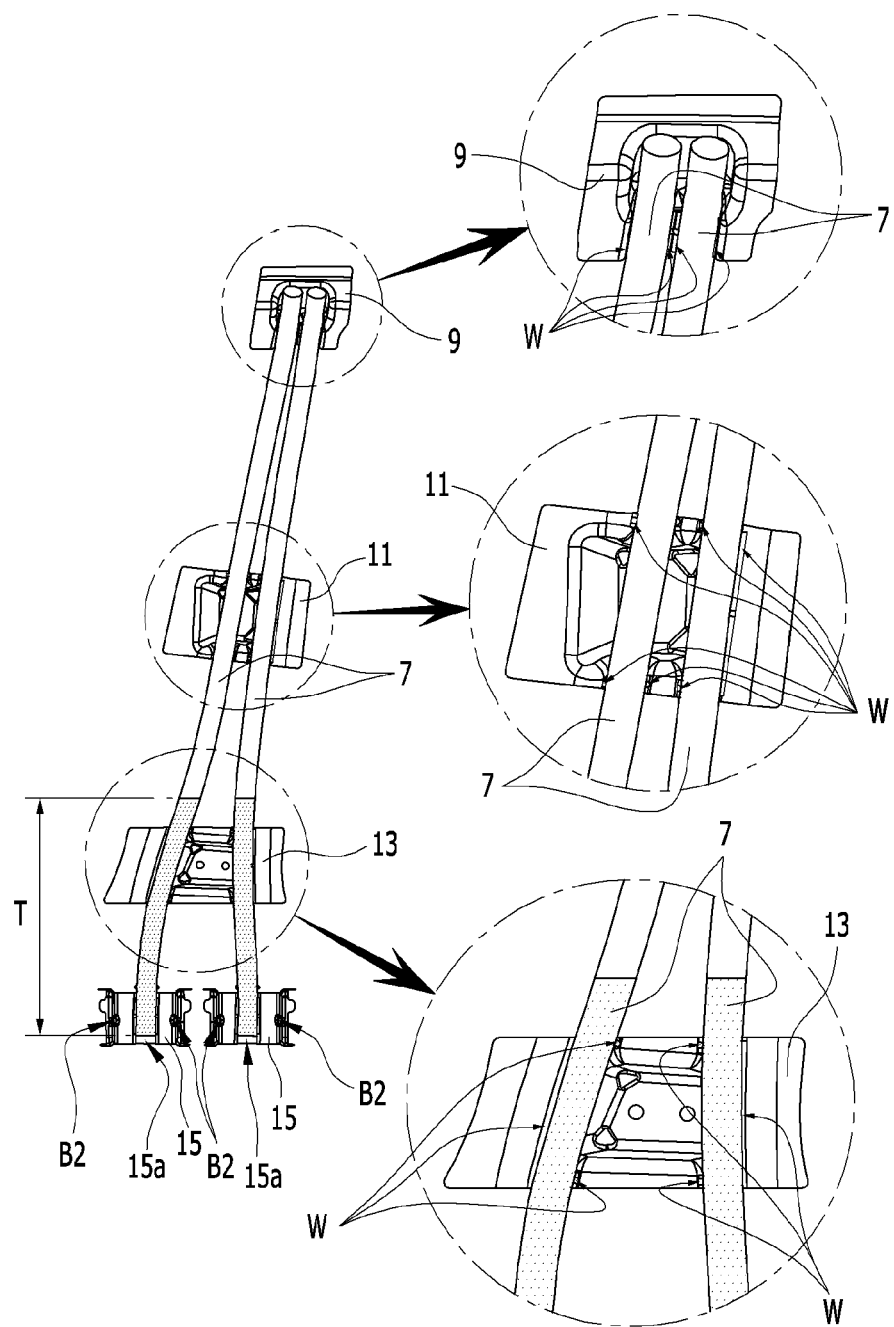
FIG. 3 is an enlarged view illustrating a reinforcement beam and welding portions applied to a center pillar reinforcement unit for a vehicle according to an exemplary embodiment of the present invention.
Figure 4:
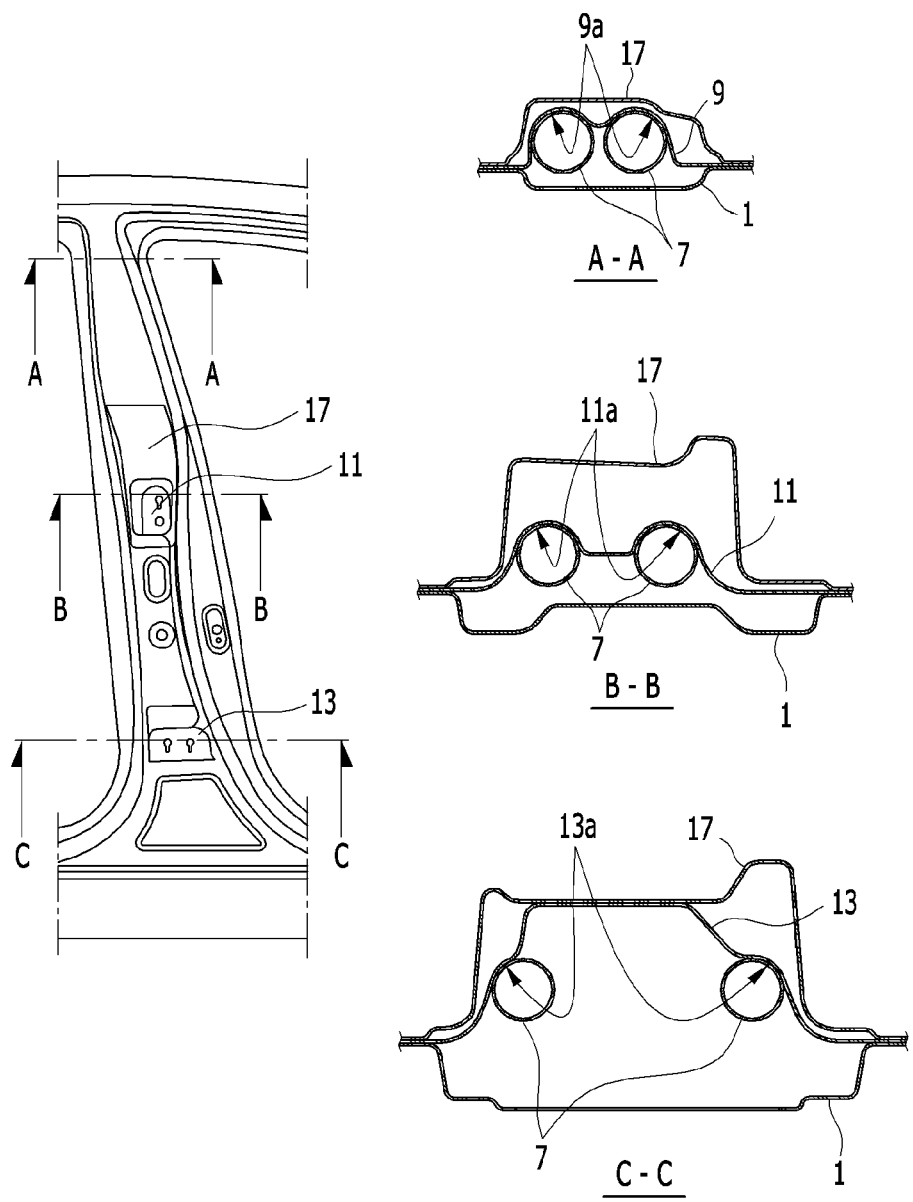
FIG. 4 is a cross-sectional view illustrating a center pillar applied to a center pillar reinforcement unit for a vehicle according to an exemplary embodiment of the present invention.

FIG. 1 is an outer perspective view illustrating a center pillar reinforcement unit for a vehicle disposed to a center pillar according to an exemplary embodiment of the present invention. FIG. 2 is an inner perspective view illustrating a center pillar reinforcement unit for a vehicle disposed a center pillar according to an exemplary embodiment of the present invention. FIG. 3 is an enlarged view illustrating a reinforcement beam and welding portions applied to a center pillar reinforcement unit for a vehicle according to an exemplary embodiment of the present invention. FIG. 4 is a cross-sectional view illustrating a center pillar applied to a center pillar reinforcement unit for vehicle according to an exemplary embodiment of the present invention.

Referring to FIG. 1 and FIG. 2, a center pillar reinforcement unit for a vehicle according to an exemplary embodiment of the present invention includes a reinforcement beam 7, an upper bracket 9, a center bracket 11, a lower bracket 13, and a gusset bracket 15.

The reinforcement beam 7 is disposed on an exterior circumference of a center pillar inner panel 1 in a height direction, and reinforcement beams 7 neighboring each other are respectively disposed on a front side and a rear side of the center pillar inner panel 1.

The reinforcement beam 7 is a tube formed with a circular shape, is made of an ultra-high strength steel pipe, and is formed by bending according to an outer line of the center pillar inner panel 1.

A softening processing section T is formed in a predetermined section of a lower portion of the two reinforcement beams 7, and the softening processing section T is softened by a laser heat treatment.

When the softening processing section T is heat-treated, a focal width of a laser beam may be approximately 40 mm which is a high focal width compared with a $CO_2$ laser or Nd-YAG laser, and a heat treatment speed may be set within a range of 5-20 mm/s such that appropriate heat input can be acquired. Since a predetermined section of the reinforcement beam 7 made of the ultra-high strength steel pipe is heated to a temperature such that it is austenitized, and internal stress is removed through slow cooling. Therefore, the predetermined section of the reinforcement beam 7 is softer compared with a conventional metal texture.

The upper bracket 9 is disposed on an upper end portion of the center pillar inner panel 1 and a roof rail 3, and fixes an upper end of the reinforcement beam 7 to the center pillar inner panel 1 and the roof rail 3.

The center bracket 11 is disposed on a center portion of the center pillar inner panel 1, and fixes a center of the reinforcement beam 7 to the center pillar inner panel 1.

The lower bracket 13 is disposed on a lower portion of the center pillar inner panel 1, and fixes a lower portion of the reinforcement beam 7 to the center pillar inner panel 1.

Two gusset brackets 15 are provided, and are respectively disposed inside of a side sill 5 in order to fix a lower portion of the reinforcement beams 7. That is, the lower portion of the reinforcement beams 7 passes through an upper side of the side sill 5, and is attached and fixed to the gusset bracket 15 in the side sill 5.

At this time, beads B2 are formed in a center of opposite sides of the gusset bracket 15, respectively, and the beads reinforce the gusset bracket 15. Beads B1 are formed in an exterior circumference of the reinforcement beam 7 between the center bracket 11 and the lower bracket 13. Particularly, the beads B1 are formed in an upper portion of the softening processing section T. The beads B1 are formed such that a part of the reinforcement beam 7 is pressed and formed as a flat shape. The beads B1 have a function such that the reinforcement beam 7 is deformed toward the beads B1 in a side collision of the vehicle such that the collision energy is effectively distributed. Particularly, the beads B1 have a function such that deformation of the softening processing section T is expanded.

A fixing structure for fixing the two reinforcement beam 7 to the center pillar inner panel 1 through the upper bracket 9, the center bracket 11, the lower bracket 13, and the gusset bracket 15 will be described in detail referring to FIG. 3 and FIG. 4.

Referring to FIG. 3 and FIG. 4, pairs of seating surfaces (9a, 11a, and 13a) formed with a semicircular shape are formed in the upper bracket 9, the center bracket 11, and the lower bracket 13, respectively. The reinforcement beams 7 are seated and welded in the pairs of seating surfaces (9a, 11a, and 13a).

A distance between the pair of seating surfaces 11a in the center bracket 11 is wider than a width between the pair of seating surfaces 9a in the upper bracket 9, and the width between the pair of seating surfaces 13a in the lower bracket 13 is wider than the width between the pair of seating surfaces 11a in the center bracket 11.

A welding portion W is formed between the reinforcement beams 7 and the seating surfaces (9a, 11a, and 13a) by $CO_2$ welding in a state where an upper portion, a center portion, and a lower portion of the two reinforcement beam 7 are seated in the seating surfaces (9a, 11a, and 13a).

At this time, the upper bracket 9 fixed to the upper portion of the reinforcement beam 7 by welding is spot-welded to the roof rail 3 and the upper end portion of the exterior circumference of the center pillar inner panel 1 together with a center pillar outer panel 17. Further, the center bracket 11 fixed to the center of the reinforcement beam 7 is spot-welded to a center of an exterior circumference of the center pillar inner panel 1 together with the center pillar outer panel 17.

Further, the lower bracket 13 fixed to the lower portion of the reinforcement beam 7 by welding is spot-welded to a lower portion of the center pillar inner panel 1 together with the center pillar outer panel 17.

Referring to FIG. 2, two seating surfaces 15a formed with a semicircular shape are formed in the gusset bracket 15, and a lower end of the reinforcement beam 7 is seated in the two seating surfaces 15a of the gusset bracket 15 and the lower end is welded.

That is, a welding portion W is formed by $CO_2$ welding between the reinforcement beam 7 and the seating surface 15a in a state where the lower end of the two reinforcement beam 7 is seated in the seating surface 15a formed in the two gusset brackets 15.

The gusset bracket 15 that is fixed to the lower end of the reinforcement beam 7 by welding is fixed in the side sill 5 by welding. Since the lower end of the reinforcement beam 7 passes through the upper portion of the side sill 5 and the lower end of the reinforcement beam 7 is fixed to the gusset bracket 15 by welding, the gusset bracket 15 prevents the reinforcement beam 7 from being moved in the outer direction of the vehicle body.

Here, openings of the seating surfaces (9a, 11a, 13a, and 15a) of the upper bracket 9, the center bracket 11, the lower bracket 13 and the gusset bracket 15 are formed toward the center pillar inner panel 1.

The softening processing section of the reinforcement beam 7 is fixed to the center pillar inner panel 1 and in the side sill 5 through the lower bracket 13 and two gusset brackets 15, and the two reinforcement beams 7 are fixed to the upper portion of the side sill 5 by $CO_2$ welding. That is, the reinforcement beam 7 is directly fixed to the side sill 5.

Meanwhile, the center bracket 11 may be formed of an upper mounting bracket of a rear door for connecting an upper hinge of the rear door, and the lower bracket 13 may be formed of a lower mounting bracket of the rear door for connecting a lower hinge. When the center bracket 11 and the lower bracket 13 are formed of the upper mounting bracket and the lower mounting bracket of the rear door, as shown in FIG. 4, penetration holes are formed in the center pillar outer panel 17 in order to expose mounting portions of the center bracket 11 and the lower bracket 13.

Figure 5:
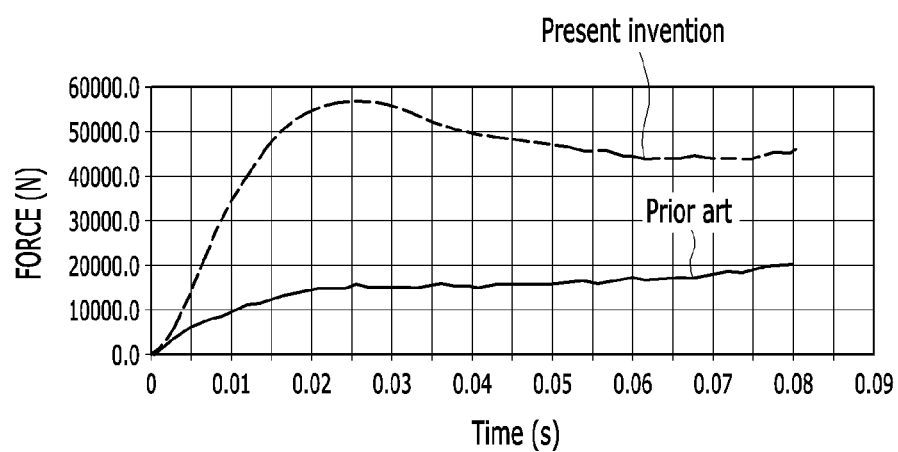
FIG. 5 is a graph illustrating strength analysis of a center pillar applied to a center pillar reinforcement unit for a vehicle according to an exemplary embodiment of the present invention and a prior art.

FIG. 5 is a graph illustrating strength analysis of a center pillar applied to a center pillar reinforcement unit for a vehicle according to an exemplary embodiment of the present invention and a prior art.

FIG. 5 shows experimental results of strength of the center pillar according to the present invention and a prior art. A load condition is that a collision speed is 1 mm/s and a static load is applied such that a deformation amount of the center pillar reaches 80 mm in a state where an upper end and a lower end of the center pillar to which the center pillar reinforcement unit is applied are fixed.

The experimental results show that the center pillar according to a prior art supports a load of approximately 20,000 N, but the center pillar according to the present invention supports a load of approximately 56,000 N. That is, the strength of the center pillar according to the present invention is improved to approximately 2.8 times that of the center pillar according to the prior art.

As described above, according to an exemplary embodiment of the present invention, since the exterior circumference of the center pillar inner panel 1 and the side sill 5 is fixed by the two reinforcement beams 7 through five brackets 9, 11, 13, and 15 in a height direction, the collision energy caused by a side collision of the vehicle is distributed to both sides of the vehicle body and the side sill 5 independent of the occupant, and is absorbed.

Further, according to an exemplary embodiment of the present invention, the energy-absorbing performance of the side of the center of the vehicle body is improved, so it is possible to ensure safety of the occupant by reinforcing the side strength of the vehicle. Since the two reinforcement beams 7 are made of an ultra-high strength steel pipe that is not heavy, the weight of the vehicle body can be reduced and a configuration of the vehicle body can be simplified.

In addition, required strength of the reinforcement beam 7 can be acquired by adjusting a thickness of the reinforcement beam 7.

Further, since the predetermined section of the reinforcement beam 7 is formed by the softening process by the laser heat treatment and the softened section supports the side sill 5, the reinforcement beam 7 simultaneously absorbs collision energy itself and the collision energy is distributed to the side sill 5 through bending of the softened processing section. Therefore, it is possible to provide reliable energy-absorbing performance.

DESCRIPTION OF SYMBOLS

1: center pillar inner panel
3: roof rail
5: side sill
7: reinforcement beam
9: upper bracket
11: center bracket
13: lower bracket
15: gusset bracket
17: center pillar outer panel 9a, 11a, 13a, 15a: seating surface
B1, B2: bead
W: welding portion
T: softening processing section While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A center pillar reinforcement unit for a vehicle comprising:
    a plurality of reinforcement beams disposed on an exterior circumference of a center pillar inner panel in a height direction;
    an upper bracket disposed on an upper end portion of the center pillar inner panel and a roof rail, and fixing an end portion of the plurality of reinforcement beams;
    a center bracket disposed on a center portion of the center pillar inner panel, and fixing a center of the plurality of reinforcement beams;
    a lower bracket disposed on a lower portion of the center pillar inner panel, and fixing a lower portion of the plurality of reinforcement beams; and
    a gusset bracket formed inside of a side sill so that the lower portion of the plurality of reinforcement beams is assembled,
    wherein two seating surfaces are formed in each of the upper bracket, the center bracket, and the lower bracket such that the reinforcement beams are seated therein, and the two seating surface are formed with a semicircular shape.

2. The center pillar reinforcement unit for the vehicle of claim 1, wherein the plurality of reinforcement beams are provided as a pair, and the pair of reinforcement beams neighboring each other are respectively disposed on a front side and a rear side of the center pillar inner panel in a length direction of the vehicle body.

3. The center pillar reinforcement unit for the vehicle of claim 1,
    wherein the plurality of reinforcement beams are made of tubes formed with a circular shape and formed by bending corresponding to an outer line of the center pillar inner panel.

4. The center pillar reinforcement unit for the vehicle of claim 1,
    wherein beads are formed in an exterior circumference of the plurality of reinforcement beams between the center bracket and the lower bracket.

5. The center pillar reinforcement unit for the vehicle of claim 4,
    wherein the beads are formed such that a part of the exterior circumference of the reinforcement beam is pressed and formed with a flat shape.

6. The center pillar reinforcement unit for the vehicle of claim 1,
    wherein a width between the two seating surfaces in the center bracket is wider than a width between the two seating surfaces in the upper bracket, and a width between the two seating surfaces in the lower bracket is wider than the width between the two seating surfaces in the center bracket.

7. The center pillar reinforcement unit for the vehicle of claim 1,
    wherein the lower portion of the plurality of reinforcement beams is attached to the gusset bracket in the side sill by passing through upper side of the side sill.

8. The center pillar reinforcement unit for the vehicle of claim 7,
    wherein the plurality of reinforcement beams are $CO_2$-welded inside the gusset bracket.

9. The center pillar reinforcement unit for the vehicle of claim 7,
    wherein the plurality of reinforcement beams are $CO_2$-welded to the upper side of the penetrated side sill, respectively.

10. The center pillar reinforcement unit for the vehicle of claim 1,
    wherein the beads are formed at opposite sides of the gusset bracket.

11. The center pillar reinforcement unit for the vehicle of claim 1,
    wherein the upper bracket is spot-welded to the roof rail and an exterior circumference of the center pillar inner panel, and the reinforcement beam is $CO_2$-welded to the seating surface of the upper bracket.

12. The center pillar reinforcement unit for the vehicle of claim 1,
    wherein the center bracket and the lower bracket are spot-welded to the exterior circumference of the center pillar inner panel, and the reinforcement beam is $CO_2$-welded to the seating surface of the center bracket and the lower bracket.

13. The center pillar reinforcement unit for the vehicle of claim 1,
    wherein a predetermined section of the lower portion of the plurality of reinforcement beam is formed as a softening processing section that is softening-processed by a laser heat treatment.

14. The center pillar reinforcement unit for the vehicle of claim 13,
    wherein the softening processing section is fixed to the inside of the center pillar inner panel and the side sill by the lower bracket and the gusset bracket.

15. The center pillar reinforcement unit for the vehicle of claim 1,
    wherein the plurality of reinforcement beams are made of an ultra-high strength steel pipe.

* * * * *